(12) United States Patent
Purcell

(10) Patent No.: US 6,535,874 B2
(45) Date of Patent: Mar. 18, 2003

(54) TECHNIQUE FOR PROVIDING A UNIVERSAL QUERY FOR MULTIPLE DIFFERENT DATABASES

(75) Inventor: Keith J. Purcell, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 53 days.

(21) Appl. No.: 09/810,859

(22) Filed: Mar. 16, 2001

(65) Prior Publication Data

US 2001/0013038 A1 Aug. 9, 2001

Related U.S. Application Data

(62) Division of application No. 08/926,063, filed on Sep. 9, 1997, now Pat. No. 6,233,584.

(51) Int. Cl.[7] ............................................. G06F 17/30
(52) U.S. Cl. ........................... 707/3; 707/103; 709/219
(58) Field of Search ........................... 707/703, 3, 103; 709/219

(56) References Cited

U.S. PATENT DOCUMENTS 5,732,270 A * 3/1998 Foody et al. ............... 709/303
5,974,441 A * 10/1999 Rogers et al. .............. 709/200
6,148,307 A * 11/2000 Burdick et al. ............ 707/104.1
6,233,584 B1 * 5/2001 Purcell ....................... 707/103
6,253,208 B1 * 6/2001 Wittgreffe et al. .......... 707/104
2001/0013038 A1 * 8/2001 Purcell ........................ 707/10
2002/0062241 A1 * 5/2002 Rubio et al. ................ 705/10

* cited by examiner

Primary Examiner—Charles Rones
(74) Attorney, Agent, or Firm—Gregory M. Doudnikoff

(57) ABSTRACT

A technique for permitting a client in a client/server computing environment to query a plurality of databases for desired data utilizing a single query sent over a network one time. The single query need not be written in the syntax for the target database, but includes the names of the database and table within the database which contains the desired data. The query is sent from the client over the network via a specified socket, and is received by servers connected to the network which are listening to the specified socket. Each server includes code which determines if the desired data is present in a database which is associated therewith. If so, the server code generates an appropriate query for its associated database, retrieves the desired data from the database and forwards the data to the client over the network. If the data is not present in the associated database, the server preferably informs the client that the data is not present in its associated database, and the client makes a record of the responses from the servers.

3 Claims, 5 Drawing Sheets

TECHNIQUE FOR PROVIDING A UNIVERSAL QUERY FOR MULTIPLE DIFFERENT DATABASES

CROSS REFERENCE TO RELATED APPLICATIONS

This patent application is a Divisional of patent application Ser. No. 08/926,063, filed Sep. 9, 1997, U.S. Pat. No. 6,233,584 issued on May 5, 2001.

BACKGROUND OF THE INVENTION

1. Field of the Invention

The present invention relates to a technique, system and computer program for utilizing a single database query to query multiple databases to which a user or application has access to find and retrieve desired data. More particularly, the present invention relates to a technique for creating a single query from a user's software program or application which is compatible with all of the databases accessible from the application that will query all such databases for data designated in the query from only a single sending of the query.

2. Description of the Related Art

Networks of linked computers are becoming more and more common. Computers linked via a network often do not have the same software programs or applications or operating systems loaded and operating thereon, or they may have different versions of the same software application or operating system. Communication is often limited between different versions of the same software application, and it is typically more difficult between different applications altogether. Thus, attempts to communicate and exchange information from one computer to another, or even between different applications loaded on the same computer, can be very difficult due to incompatibility.

One common usage of networks today is to access information or data. Information is typically maintained in storage, on devices such as hard drives, tape drives, and the like, and is managed by database management software which controls access to and the modification of the data under its control. Examples of database software include DB2 from the International Business Machines Corporation (IBM), Oracle7 from Oracle Corporation and Informix-Universal Server from Informix Software, Inc. (DB2 is a registered trademark of IBM, Oracle and Oracle7 are trademarks of the Oracle Corporation, and Informix is a trademark of Informix Software, Inc.). Quite often, when a user of a software application needs data, the user's application will contact or query a database to find and retrieve the desired information for use in the application. If the specific database in which the data is stored is known, finding and retrieving the data is a relatively simple procedure. A database query in the appropriate format for the target database is created and sent to the target database. However, for situations in which the particular database in which the data is maintained is unknown, and the user has access to multiple databases and the databases are from different vendors and/or the databases are incompatible, the task of obtaining the desired information can become quite arduous. Under presently available techniques, a database query, such as an SQL query (which is a query format which operates with SQL-enabled databases), must be sent separately to each possible database in which the desired information may be stored. Each SQL statement needs to be addressed separately and specifically for each database, which can be a time consuming task.

Accordingly, a need exists for a technique by which a single database query can be invoked which queries multiple non-homogenous databases.

SUMMARY OF THE INVENTION

An object of the present invention is to provide a technique by which a single database query may be employed to query multiple non-homogeneous databases.

Another object of the present invention is to provide a database access technique which does not require the requesting user or application to know precise details regarding the location of the database which is being queried.

Yet another object of the invention is to provide a technique for querying multiple databases which is transparent to the user or application which initiated the query.

Other objects and advantages of the present invention will be set forth in part in the description and the drawings which follow, and, in part, will be obvious from the description or may be learned by practice of the invention.

To achieve the foregoing objects, and in accordance with the purpose of the invention as broadly described herein, the present invention provides a software implemented process for use in a computing environment having a plurality of non-homogeneous databases accessible through associated servers, comprising first subprocesses for generating, at a requesting entity, a single database query requesting desired data; second subprocesses for sending the single database query over a network; third subprocesses for permitting at least some of the servers to receive the single database query; fourth subprocesses for determining, for each combination of the databases and the associated servers which received the single database query, whether the database contains the desired data; and, for the database found to contain the desired data, if any, fifth subprocesses for retrieving the desired data from the database and sending the desired data as required by the requesting entity. The requesting entity may be a client in a client/server environment, and the fifth subprocesses may further send the desired data to the client. Preferably, the request generated by the first subprocesses is an SQL query which includes the names of a target database and a table in the target database containing the desired data, but is not in a syntax required by the target database, and wherein the fifth subprocesses further generates a query for the target database in the proper syntactic form for the target database. The network preferably utilizes client/server TCP/IP socket communications, wherein the second subprocesses further comprises sending the single database query over a predefined socket port, and wherein the servers which receive the single database query in the third subprocesses are listening to the predefined socket port over the network. Further, each of the servers may be associated with a factory class which receives the single database query and determines in the fourth subprocesses whether the desired data resides in the database associated with the server with which the factory class is associated.

Additionally, the present invention provides a system for accessing data in a computer environment comprising non-homogeneous databases utilizing a database query sent once from a client which is seeking data, comprising a plurality of servers connected via a network; a plurality of databases, each of the databases associated with one of the servers, wherein at least one of the databases utilizes a query format which is different from other query formats for the databases; means associated with a client for generating a first database query requesting desired data and sending the first database query to the servers via the network; means associated with each of the servers for determining if the database associated with the server includes the desired data, and if so, preparing a second database query in a form acceptable to the associated database having the desired data which requests the desired data; and means for sending the desired data from the database having the desired data to the client. Further, the determining means may further comprise preparing and sending a response to the client if it determines that the associated database does not contain the desired data, the response informing the client that the database does not contain the desired data. Additionally, the client may construct a record relative to the first database query in which the response from each of the databases is logged. The determining means may further comprise a factory class which determines whether the associated database includes the desired data. The network may utilize client/server TCP/IP socket communications, and the client may send the first database query over the network via a predefined Java socket port, and the servers which receive the first database query are preferably programmed to listen to the predefined Java socket port.

The present invention will now be described with reference to the following drawings, in which like reference numbers denote the same element throughout.

DESCRIPTION OF THE PREFERRED EMBODIMENT

Figure 1:
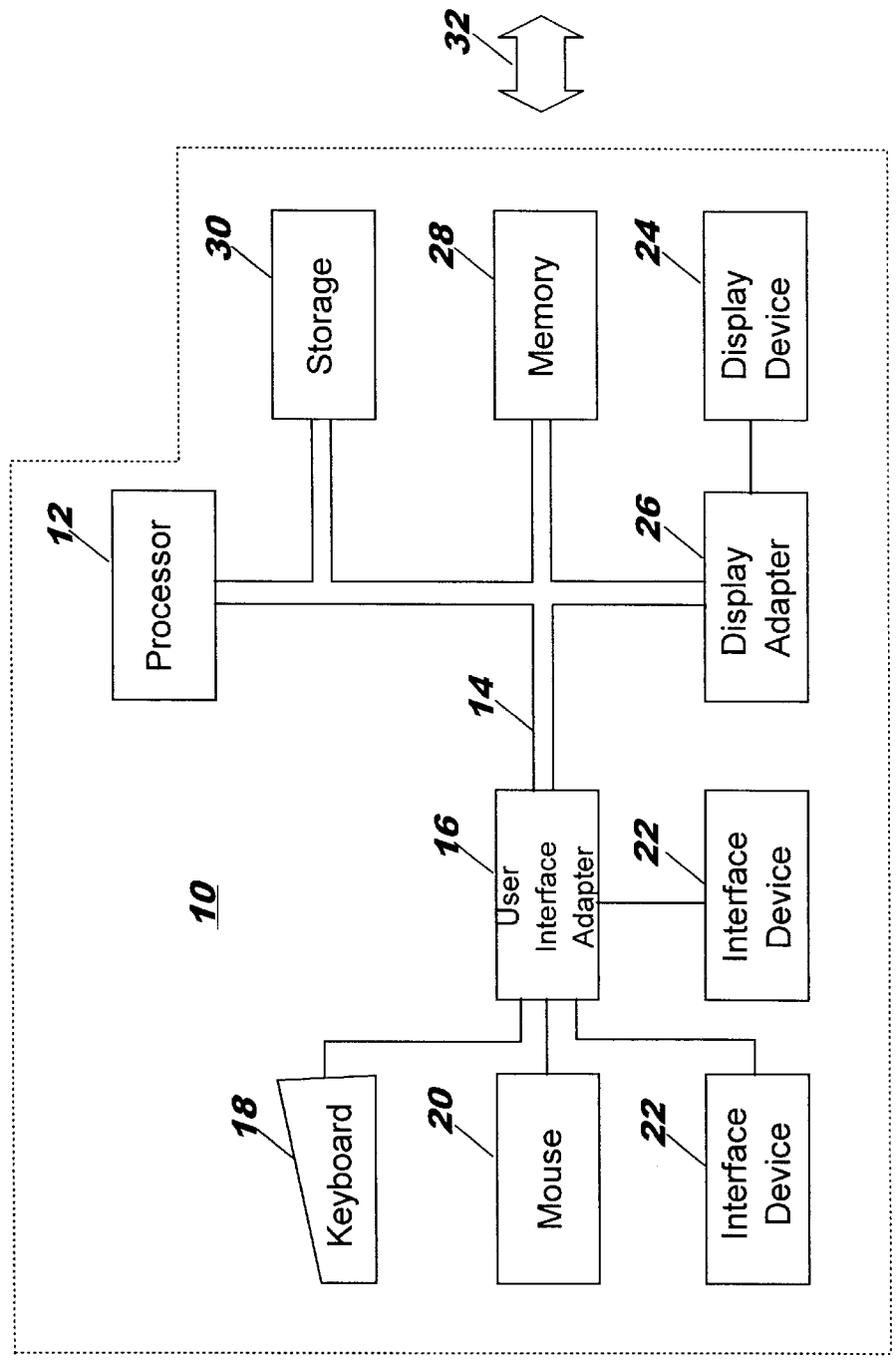
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and permanent storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
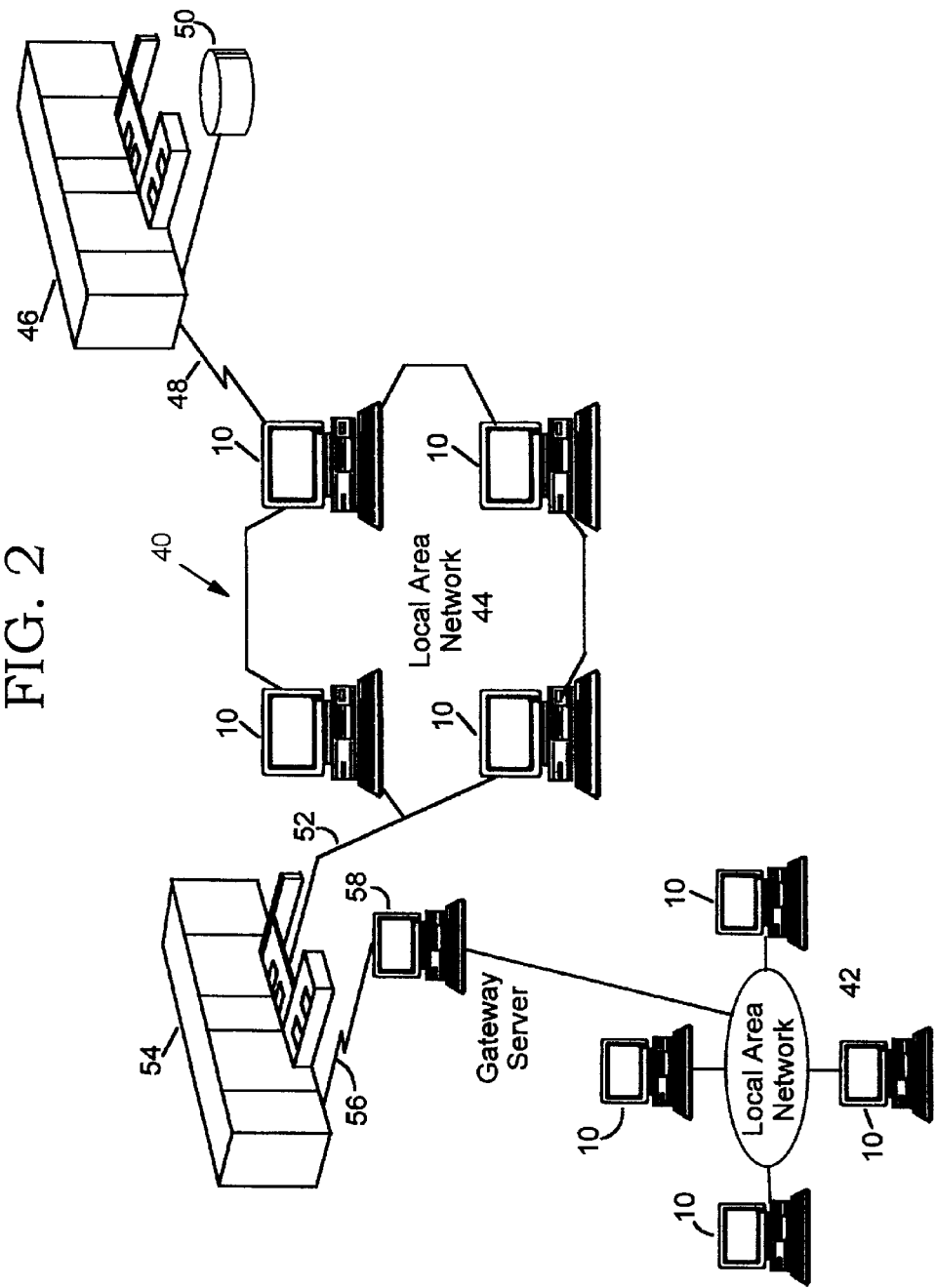
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarily, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 4.

In the preferred embodiment, the present invention is implemented as a tool written in the Java language (Java is a trademark of Sun Microsystems, Inc.). Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object oriented programming techniques, are well known to those skilled in the art, and will not be discussed in depth herein. While the present invention will be described in terms of a technique implemented in Java for accessing multiple databases from a single query, the technique may be implemented in other programming languages which are enabled for factory classes.

Figure 3:
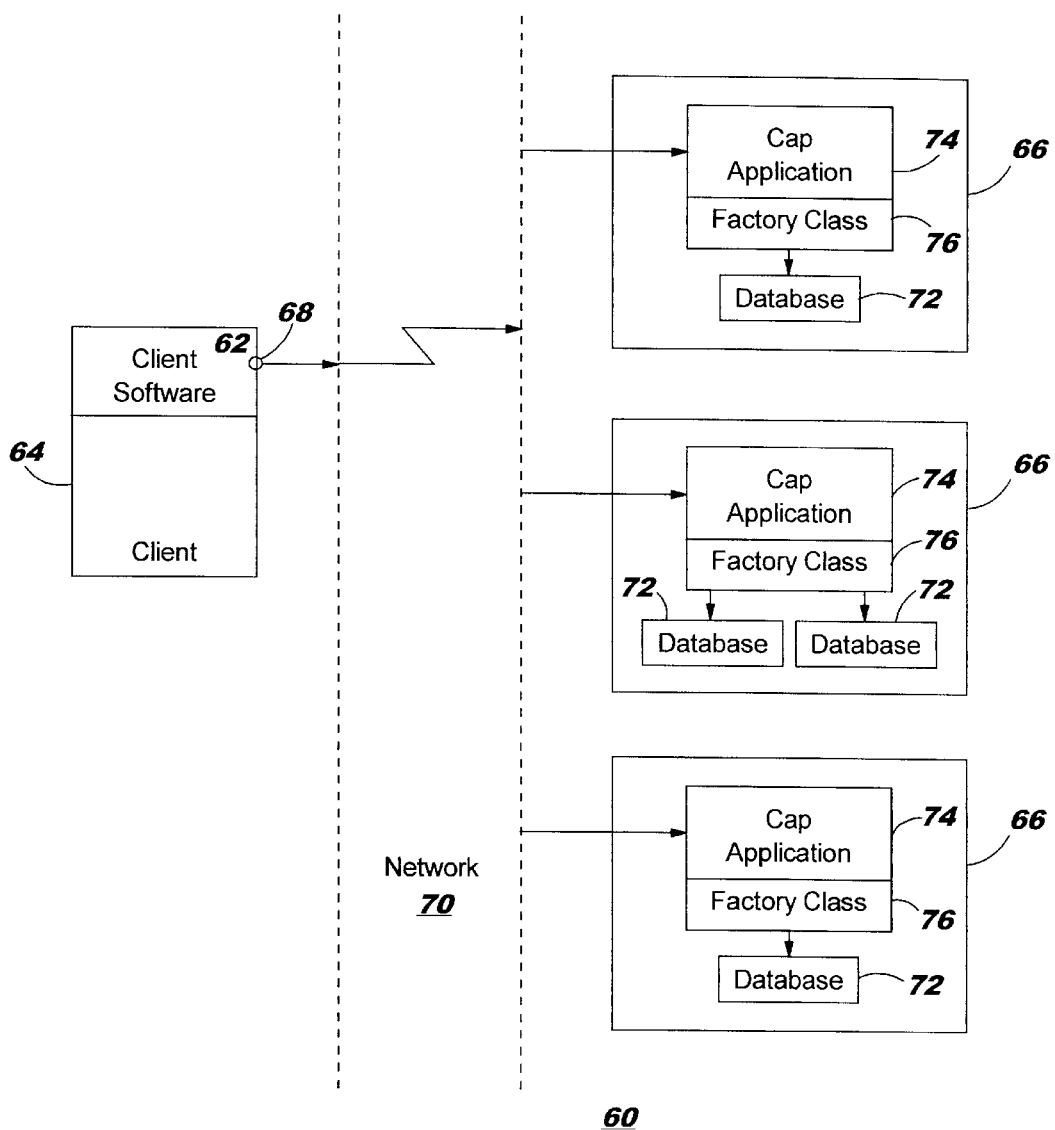
FIG. 3 is a block diagram which illustrates the flow of data involved with a universal database query in accordance with the present invention.

FIG. 3 illustrates the flow of data according to the present invention. In a client/server environment 60, client software 62 resident in a client processor 64 communicates with a number of servers 66 via a Java socket 68 at the client 62. The client 62 will generate standard SQL queries, as discussed below. The Java socket 68 has a specified port designation or number, and the servers 66 are programmed to listen for queries from the client 62 (or any other client) from the designated Java socket port via a network 70. Preferably, the network 70 utilizes client/server TCP/IP socket communications. Socket communications by its architecture provides the servers 66 with the client identification of the client 62 that sent the query. Thus, the servers 66 will know which client to respond to. Each of the servers 66 has at least one database 72 associated therewith. The present invention is especially useful when the databases 72 are non-homogeneous; that is, the databases are not all from the same manufacturer and/or require query formats which are not identical to each other.

Resident on each of the servers 66 is a database 'cap' application 74, which receives the database queries from the client 62. Each cap application 74 includes a customized factory class 76. In general, a factory class is a known technique available in Java and other languages which permits the actual type of new objects to be determined at runtime, based on data or circumstances of the moment. Factory classes are building blocks for making applications which can be extended dynamically. Factory classes permit an application containing them to perform a function (such as receive a SQL query in the present invention) and then vary its behavior depending on the particular type of data it finds when it performs the function. In essence, a factory class provides a multi way switch to choose what sort of object to allocate in response to the function. The factory class is programmed to assess the situation and decide on a particular object that should be created to fit the situation. As an object contains both data and logic, the use of a factory class can be very powerful.

Factory classes can be used to automate parsing of data based on the input provided to the object on which the factory class was instantiated. For example, a factory class is used to parse a universal resource locator (URL) within the base Java classes shipped with the Java Development Kit (JDK) available from Sun Microsystems, Inc.

In the present invention, each factory class 76 includes or has access to information pertaining to the database(s) 72 which is associated with the server 66 in which its cap application 74 resides. Preferably, this information includes data pertinent to the database, including which database its cap application is associated with, the type of database, the name of the database, and the tables which are stored in the database. This information is used by the factory class 76 to determine what object to create and where to send the object, as will be discussed below.

Figure 4A:
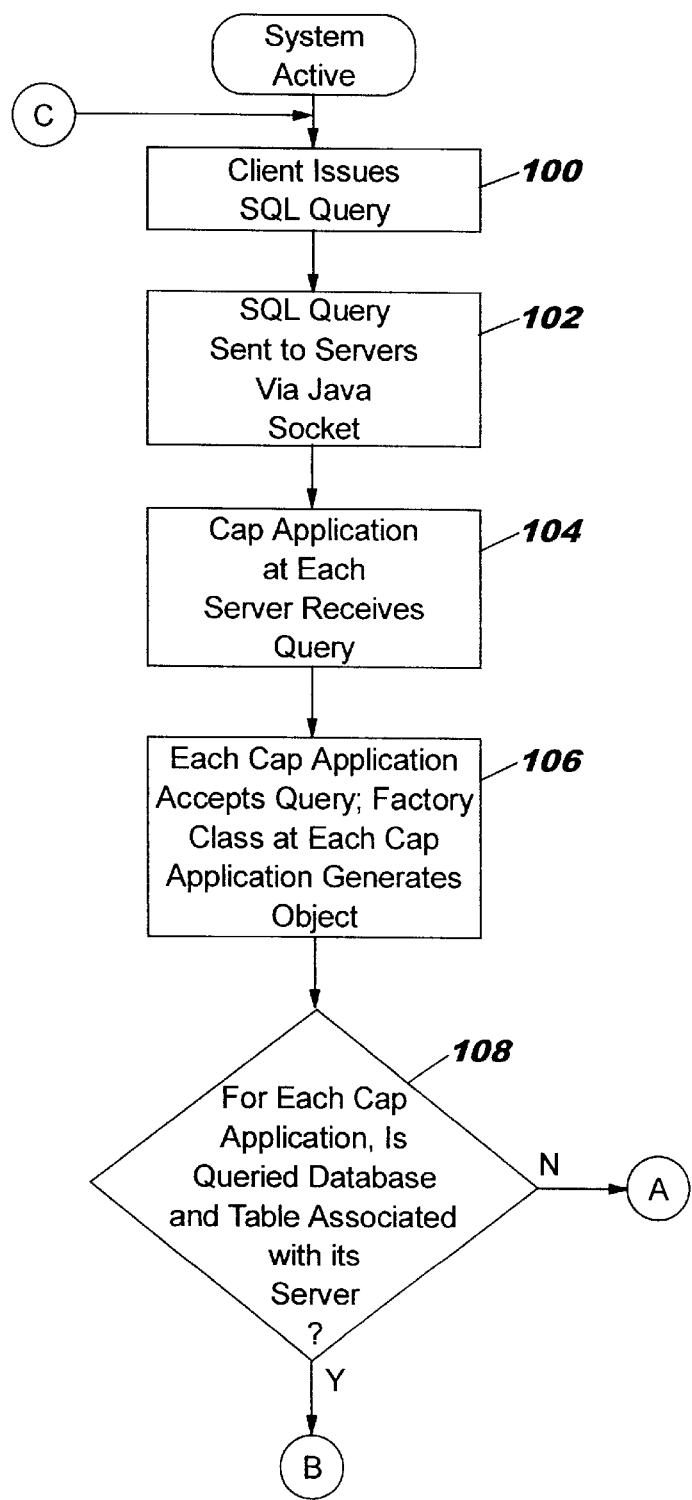
FIGS. 4A–4B illustrate a flow chart which sets forth the logic involved with the present invention.
Figure 4B:
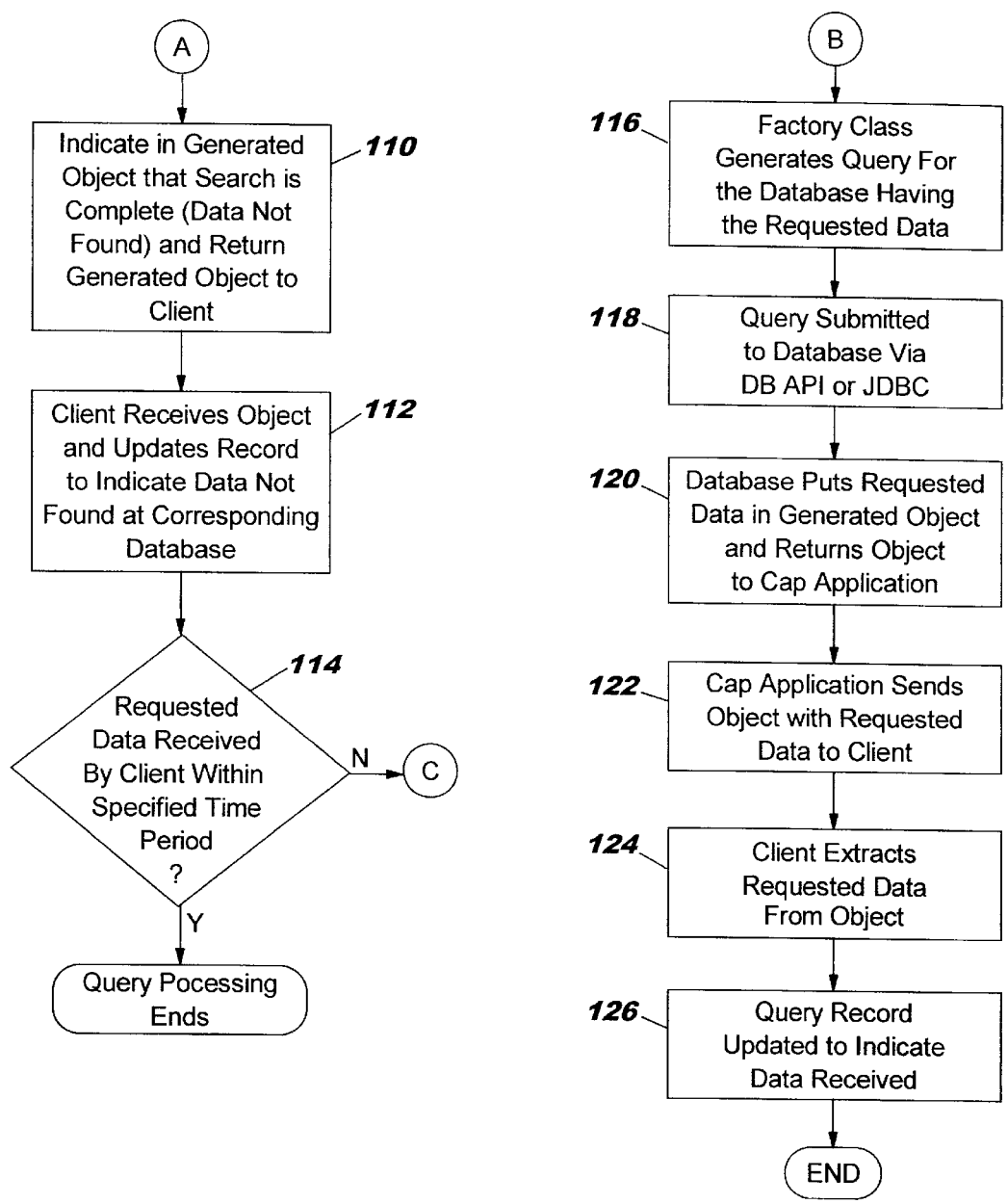

FIG. 4 illustrates the logical steps performed when the present invention is executed.

As per Step 100 and in accordance with known techniques, the client software 62 resident and executing in the client environment 64 creates a database query in SQL format. This step can by performed based on user input to a graphical query generator, automatically by the client application when it needs data, etc. However, the SQL query need not include information as to the specific location of the database or include database-specific syntax for the target database. Rather, the query may only need to identify the table name for the data which it is looking for. The client 62 sends this SQL query out over the network 70 via the designated Java socket 68 to all the servers 66 which are 'listening' in to the designated Java/client socket port (Step 102). The cap application 74 resident at each server 66 which is listening to the Java socket through which the client 62 sent the query receives the SQL query, preferably using a standard Java network class (Step 104).

The factory class 76 in each cap application 74 then generates an object which it will populate depending on what it determines relative to the query (Step 106). The factory class 76 makes the following determination. The data sent from the client 62 typically identifies the database name and table within the database in which the desired data resides. The factory class 76 reads the query and determines if the requested information is resident in the database 72 associated with the cap application 74 and its server 66 (Step 108). As discussed above, the factory class 76 has access to information regarding the database which enables it to make this determination. Typically, of all the factory classes 76 which process the query, only one of the factory classes 76 will determine that the requested data is present on its associated database 72. Therefor, the factory class 76 will usually find that the requested data is not present in its associated database. In these situations, processing will proceed to Step 110, in which in the preferred embodiment, an indication is made in the object generated by the factory class 76 in Step 106 that the search is complete. The name or identity of the database 72 is also added to the object, and the object is returned to the client 62 via the network 70 without the requested data.

Preferably, the client 62 creates a record of the responses it receives. Typically, the client 62 will know at least the identity of most if not all of the databases that it queried with its query. This list could be provided by a network administrator, or could be compiled over time utilizing the responses from queries. Upon originally generating the query, the client may generate a record in order to track responses. When the client 62 receives an object from one of the servers 66, and the object indicates that the database 72 associated with that server did not have the desired data, then the client 62 may check off the database 72 as having responded in the record for the given query (utilizing the database information placed in the object by its creating factory class 76) and leaves a blank data field in the record relative to that database 72 to indicate that the requested data was not found there (Step 112). If such a response is received from a database not previously in the list, that database can be dynamically added to the list and included in the record for the subject query, and the appropriate 'data not found' indication provided in the record for the new database.

This record keeping process becomes important if no response having the desired data is received by the client 62 within a reasonable period of time (Step 114). By checking the record, the user or the application can determine if all the known databases 72 have responded, which would generally indicate that there is a problem with the query or the data is not located in an accessible database. Alternatively, if the record indicates that no response was received relative to one or more of the known databases 72, a network or server error may have occurred, and the query can be repeated or the error can be noted. If the first option is desired, the query can be repeated in the universal format, and processing returns to Step 100, or the query can be repeated in the traditional format by which it is directed only at the non-responsive databases. If it is determined in Step 114 that the requested data has been received by the client 62, processing ends.

Alternatively to Step 110, if the factory class in a cap application 74 determines that the requested data does not reside in its associated database 72, the object it created can simply be erased and the transaction terminated without responding at all to the client 62. This would end processing relative to queries received by servers 66 which do not have the requested data in its associated database 72.

When the factory class for one of the servers 66 determines in Step 108 that the requested data is stored in its associated database 72, processing proceeds to Step 116. In Step 116, the factory class uses the information from the universal query from the client 62 and its knowledge of its associated database 72 to populate the object it has created with the appropriate information to create a tailored database query for its database 72. The object/query is submitted to the database 72 via the appropriate database interface (such as a DB API, Java Database Communication interface (JDBC), etc.) (Step 118). The factory class creates the query so that it is now database specific; that is, the query is in the specific format required by the associated database 72. The factory class uses the SQL syntax which is appropriate to its associated database 72, be it for a DB2 database, Oracle database, etc. As mentioned, the query format for these different databases is usually database specific. Thus, the client 62 does not have to prepare its original query in the required database format. The universal query system with its use of a factory class prevents this level of detail from having to be enabled in the client 62.

The database 72 receiving the query from the factory class 76 in the cap application 74 puts the requested data/resultant into the object which included the query, and returns the object to the cap application 74 (Step 120). The cap application then forwards the object containing the requested data to the client 62 (Step 122). The client 62 extracts the requested data from the object (Step 124), and manipulates the data as necessary in accordance with the user's request or the application's needs. The client 62 then updates the record for the query to indicate that the database 72 which sent the object has responded and that the data was found in that database 72 (Step 126). Processing then ends relative to the query.

The data received by the client 62 may be cached in short term memory for use at a later time, and/or the information from the report regarding the database in which the requested data was found may be stored. If quantity of data is relatively large, this latter step is preferred. In future queries, the client 62 need mot send out a universal query in response to a query request by a user or application, but send out a request to the single server on which the desired data was last known to reside using a different Java socket. This approach would serve to reduce network traffic, and a universal query could always be utilized if the targeted request fails to find the data. This could be implemented by storing the original query and storing the identity of the database on which the requested data was found. Thus, if the same query is repeated, rather than create a universal query, a targeted query is created. Once again, this process would be transparent to the user/application which makes the request.

While the present invention has been described relative to the Java programming language, the basic techniques described herein may be applicable to many types of object oriented languages. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

What is claimed is:

1. In a computing environment, a method for querying a plurality of databases for desired data using a single database query, said method comprising the steps of:

generating a global database query at a client which requests desired data;

transmitting the global database query over a network to a plurality of servers, each of said servers being associated with one or more databases;

for each server and database combination, determining whether the database associated with the server contains the desired data, wherein each of the servers is associated with a factory class, and the factory class for each of the servers receives the global database query and determines whether the desired data resides in the database associated with the server; and retrieving the desired data from each of the databases that contains the desired data and transmitting the desired data over the network to the client.

2. A method according to claim 1, wherein the factory class generates a query for the database associated with its associated server for determining whether the desired data resides in the database.

3. A method according to claim 1, wherein the network utilizes client/server TCP/IP socket communications, and wherein said transmitting step further comprises sending the global database query over the network via a predefined socket port, and the servers which receive the global database query listen to the predefined socket port.

* * * * *